United States Patent
Marshall

(10) Patent No.: US 11,941,651 B2
(45) Date of Patent: Mar. 26, 2024

(54) LCP PRICING TOOL

(71) Applicant: CDW LLC, Vernon Hills, IL (US)

(72) Inventor: Sandy Marshall, Max Meadows, VA (US)

(73) Assignee: CDW LLC, Vernon Hills, IL (US)

( * ) Notice: Subject to any disclaimer, the term of this patent is extended or adjusted under 35 U.S.C. 154(b) by 0 days.

(21) Appl. No.: 16/829,666

(22) Filed: Mar. 25, 2020

(65) Prior Publication Data

US 2021/0304234 A1    Sep. 30, 2021

(51) Int. Cl.
| | |
|---|---|
| G06Q 30/02 | (2023.01) |
| G06F 16/23 | (2019.01) |
| G06N 3/045 | (2023.01) |
| G06N 3/08 | (2023.01) |
| G06Q 10/10 | (2023.01) |
| G06Q 30/0201 | (2023.01) |
| G06Q 30/04 | (2012.01) |

(52) U.S. Cl.
CPC ..... *G06Q 30/0206* (2013.01); *G06F 16/2379* (2019.01); *G06N 3/045* (2023.01); *G06N 3/08* (2013.01); *G06Q 10/10* (2013.01); *G06Q 30/04* (2013.01)

(58) Field of Classification Search
None
See application file for complete search history.

(56) References Cited

U.S. PATENT DOCUMENTS

| | | | | |
|---|---|---|---|---|
| 10,718,031 | B1* | 7/2020 | Wu | H04M 3/51 |
| 2014/0108090 | A1* | 4/2014 | Hwang | G06Q 30/0206 |
| | | | | 705/7.29 |
| 2017/0124576 | A1* | 5/2017 | Lagoni | G06Q 30/0282 |
| 2019/0050445 | A1* | 2/2019 | Griffith | G06F 16/2365 |
| 2020/0211077 | A1* | 7/2020 | He | G06Q 30/0611 |
| 2021/0097479 | A1* | 4/2021 | Saffar | G06N 20/20 |
| 2022/0027959 | A1* | 1/2022 | Paliwal | G06Q 30/0275 |

OTHER PUBLICATIONS

Korotkevitch, D., 2014. Temporary Tables. In Pro SQL Server Internals (pp. 233-254). Apress, Berkeley, CA. (Year: 2014).*
Rohaan, D., 2020. Prioritizing requests for quotation on sales potential (Master's thesis, University of Twente) (Year: 2020).*

* cited by examiner

*Primary Examiner* — Chesiree A Walton
*Assistant Examiner* — Marjorie Pujols-Cruz
(74) *Attorney, Agent, or Firm* — MARSHALL, GERSTEIN & BORUN LLP; Randall G. Rueth

(57) ABSTRACT

Methods and systems for determining a set of lowest corresponding price data related to a salable unit are disclosed herein. An example method includes receiving an input indicative of the salable unit, the input including a current date. The example method further includes generating a set of comparable salable unit data based on the input. Each respective comparable salable unit data in the set of comparable salable unit data includes a respective prior date within a date threshold from the current date. The example method further includes determining the set of lowest corresponding price data by applying an exclusion model to the set of comparable salable unit data, and transmitting a notification of the set of lowest corresponding price data for display to a user. The example method further includes storing the set of lowest corresponding price data into an historical transaction log.

20 Claims, 4 Drawing Sheets

LCP PRICING TOOL

FIELD OF THE DISCLOSURE

The present disclosure is generally directed to methods and systems for automatic quote evaluation for salable units and, more particularly, to techniques for analyzing comparable salable unit data to selectively determine lowest corresponding price data.

BACKGROUND

In large-scale commercial goods and services industries, prices for the provided products frequently fluctuate. These fluctuations may reflect market forces causing the entire industry to change the price of a product, but they may also reflect a particular provider's pricing strategy. A provider may, for example, charge different prices for identical products to differently situated customers. Thus, when a customer wants to know how much a provider is going to charge the customer for their product, the customer will typically request a price quotation for that product.

A price quotation ("price quote") generally outlines the goods and/or services offered to a customer for a stated price. Generally, a customer will seek a competitive price for a product by requesting price quotes from multiple providers. Each provider is unaware of the quoted price from every other provider, so the price quoted to a customer normally dictates whether the provider receives business from the customer.

Correspondingly, a major point of emphasis in the commercial goods and services industry is accurately and efficiently generating price quotes as this can pose a substantial challenge for traditional systems. Providing a quote for a single product typically involves detailed invoice reporting that compares numerous other quotes or products. A traditional system runs multiple queries to make these comparisons and typically does not assess a particular pricing strategy for a customer. Moreover, many commercial goods and/or services providers generate a massive volume of quotes each day, resulting in a significant time sink for the provider.

Accordingly, there is a need for methods and systems for quickly and accurately generating price quotes to facilitate consistent and reliable pricing strategies.

BRIEF SUMMARY

In one aspect, a method for determining a set of lowest corresponding price data related to a salable unit is executed by at least one processor of a computer. The method comprises receiving an input indicative of the salable unit, the input including a current date; generating a set of comparable salable unit data based on the input, wherein each respective comparable salable unit data in the set of comparable salable unit data includes a respective prior date within a date threshold from the current date; determining the set of lowest corresponding price data by applying an exclusion model to the set of comparable salable unit data; transmitting a notification of the set of lowest corresponding price data for display to a user, the notification indicating a lowest corresponding price for each lowest corresponding price data; and storing the set of lowest corresponding price data into an historical transaction log.

In another aspect, a system for determining a set of lowest corresponding price data related to a salable unit is described. The system comprises one or more processors and a memory storing computer-readable instructions that, when executed, cause the one or more processors to: receive an input indicative of the salable unit, the input including a current date; generate a set of comparable salable unit data based on the input, wherein each respective comparable salable unit data in the set of comparable salable unit data includes a respective prior date within a date threshold from the current date; determine the set of lowest corresponding price data by applying an exclusion model to the set of comparable salable unit data; transmit a notification of the set of lowest corresponding price data for display to a user, the notification indicating a lowest corresponding price for each lowest corresponding price data; and store the set of lowest corresponding price data into an historical transaction log.

In yet another aspect, a non-transitory computer readable medium containing program instructions is described. When executed, the program instructions cause a computer to: receive an input indicative of the salable unit, the input including a current date; generate a set of comparable salable unit data based on the input, wherein each respective comparable salable unit data in the set of comparable salable unit data includes a respective prior date within a date threshold from the current date; determine the set of lowest corresponding price data by applying an exclusion model to the set of comparable salable unit data; transmit a notification of the set of lowest corresponding price data for display to a user, the notification indicating a lowest corresponding price for each lowest corresponding price data; and store the set of lowest corresponding price data into an historical transaction log.

BRIEF DESCRIPTION OF THE DRAWINGS

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
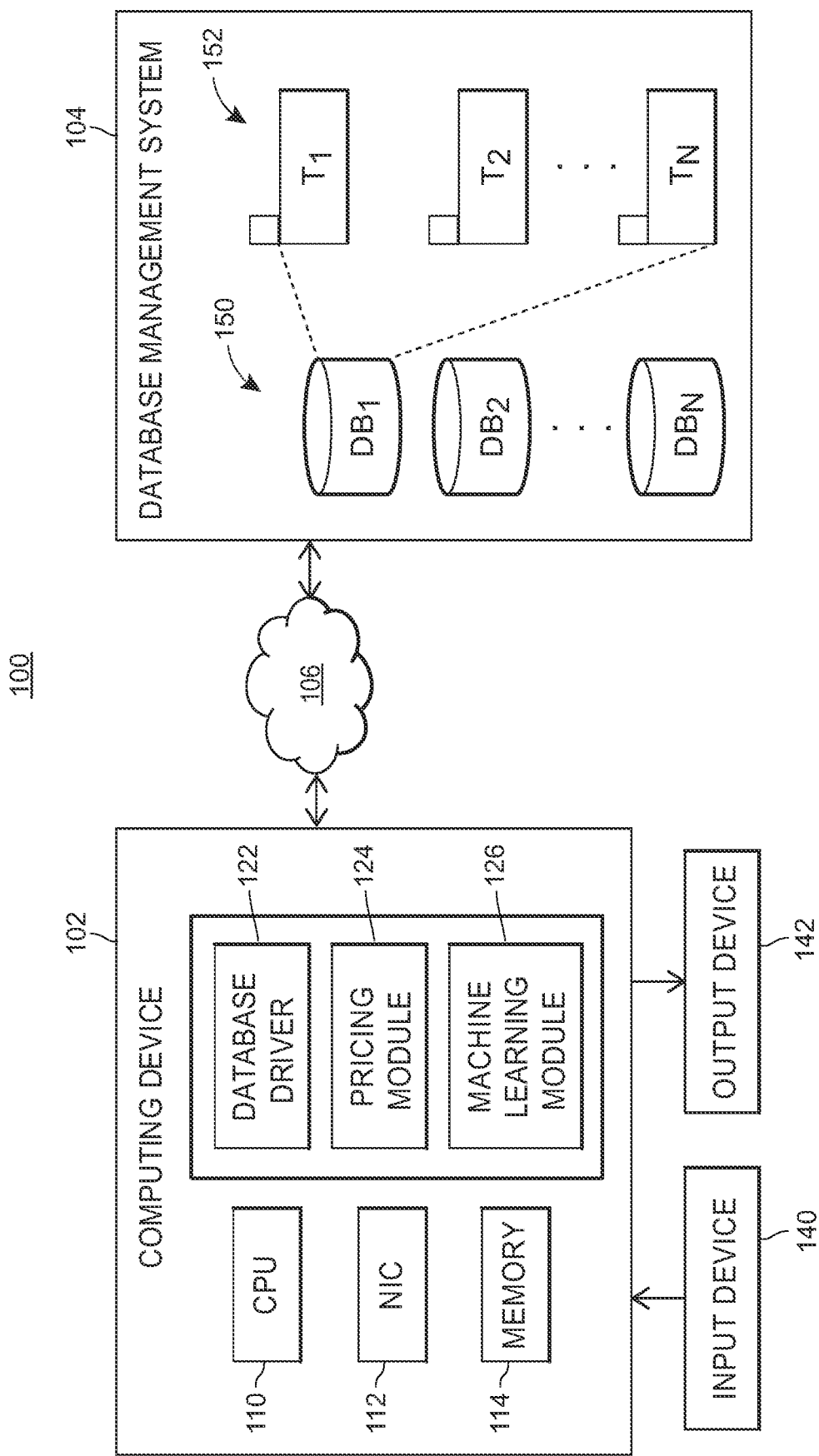
FIG. 1 depicts an exemplary computing environment in which methods and systems for determining lowest corresponding price data may be implemented, in accordance with embodiments described herein.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The embodiments described herein relate to, inter alia, automatic quote evaluation for salable units. In embodiments, the present techniques include methods and systems for selectively determining lowest corresponding price data for salable units on a customer-by-customer basis. Specifically, the present techniques enable customer-specific price quoting by applying a unique exclusion model to historical quote and invoice data. The present techniques differ from traditional quote pricing at least in that they streamline processing, such that the processing resources, memory resources, and time required to perform quote pricing are greatly reduced.

As mentioned, commercial goods and services providers typically record potential sales using price quotes and actual sales using invoices. Generally, generating a price quote involves reviewing the recorded invoice and quote data to determine product prices that have previously resulted in a sale. Each invoice and quote may be categorized and recorded in an internal (or external) database that may include reams of data, much of which may have been processed years ago. Specifically, conventional techniques involve scanning or searching entire invoice and/or quote databases to identify entries featuring similar products.

Problematically, scanning or searching such large databases may take a long time as the size of each database may act as a processing bottleneck. Moreover, these evaluations may require moving all or portion of the recorded entries to working memory, which typically includes far less storage capacity than long-term memory (e.g., the large databases). Consequently, the working memory may be unable to include all relevant entries during a single transfer of data from the long-term storage databases. The system may then perform another search of the large databases and transfer another set of entries to working memory for further processing. In all, these conventional techniques experience multiple processing bottlenecks causing the quote pricing process to last an excruciatingly long time.

To further complicate matters, conventional techniques create an unsavory user interactive experience. Users may receive large volumes of data that are unsorted, outdated, and/or otherwise irrelevant. For example, conventional techniques may search an invoice database to retrieve all entries related to a particular product, such that the output includes all product sales since the inception of the invoice database. Due to the market fluctuations and other forces causing pricing schemes to change, such an expansive look at the invoice history of the product may be largely irrelevant to a current quote for that product. When a user receives this data, they may be unable to correctly or meaningfully interpret the mass of information presented. Similarly, conventional techniques typically do not perform automatic analysis of a feasible pricing strategy upon retrieval of the quote/invoice data. Consequently, conventional techniques create an nearly unusable quote pricing experience for users because they may cause a user to sort through and analyze mass quantities of unintelligible data.

The present techniques are useful for alleviating these processing bottlenecks and vastly improving the usability of the quote pricing experience. Namely, the present techniques reduce the processing and memory resources required to perform quote pricing by utilizing transitory comparison data tables and adaptable exclusionary rules applied to the quote/invoice data. Moreover, the present techniques automatically analyze, interpret, and sort the results of searching and analyzing the quote/invoice tables to provide a user with readily usable and easily interpretable pricing data.

In general, the present techniques facilitate workers following quote pricing best practices through an enhanced processing environment and an improved user interface.

Exemplary Computing Environment

FIG. 1 depicts an exemplary computing environment 100 in which the techniques disclosed herein may be implemented, according to an embodiment. The environment 100 includes a client computing device 102, a database management system (DBMS) 104, and a network 106. Some embodiments may include a plurality of client computing devices 102 and/or a plurality of DBMSs 104.

The client computing device 102 may be an individual server, a group (e.g., cluster) of multiple servers, or another suitable type of computing device or system (e.g., a collection of computing resources). For example, the client computing device 102 may be any suitable computing device (e.g., a server, a mobile computing device, a smart phone, a tablet, a laptop, a wearable device, etc.). In some embodiments, one or more components of the computing device 102 may be embodied by one or more virtual instances (e.g., a cloud-based virtualization service). In such cases, one or more client computing device 102 may be included in a remote data center (e.g., a cloud computing environment, a public cloud, a private cloud, etc.).

The network 106 may be a single communication network, or may include multiple communication networks of one or more types (e.g., one or more wired and/or wireless local area networks (LANs), and/or one or more wired and/or wireless wide area networks (WANs) such as the Internet). The network 106 may enable bidirectional communication between the client computing device 102 and the DBMS 104, or between multiple client computing devices 102, for example.

The client computing device 102 includes a processor 110 and a network interface controller (NIC) 112. The processor 110 may include any suitable number of processors and/or processor types, such as CPUs and one or more graphics processing units (GPUs). Generally, the processor 110 is configured to execute software instructions stored in a memory 114. The memory 114 may include one or more persistent memories (e.g., a hard drive/solid state memory) and stores one or more set of computer executable instructions/modules 120, including a database driver 122, a pricing module 124, and a machine learning module 126

The client computing device 102 further includes an input device 140 and an output device 142. The input device 140 may include any suitable device or devices for receiving input, such as one or more microphone, one or more camera, a hardware keyboard, a hardware mouse, a capacitive touch screen, etc. The output device 142 may include any suitable device for conveying output, such as a hardware speaker, a computer monitor, a touch screen, etc. In some cases, the input device 140 and the output device 142 may be integrated into a single device, such as a touch screen device that accepts user input and displays output. The client computing device 102 may be associated with (e.g., owned/operated by) a company that services enterprise customers.

The NIC 112 may include any suitable network interface controller(s), such as wired/wireless controllers (e.g., Ethernet controllers), and facilitate bidirectional/multiplexed networking over the network 106 between the client computing device 102 and other components of the environment 100 (e.g., another client computing device 102, the DBMS 104, etc.).

The one or more modules 120 implement specific functionality. For example, in an embodiment, the database driver module 122 includes computer-executable instructions that, when executed, cause a computer to access one or more electronic databases. For example, the database driver module 122 may include a library of client bindings for accessing a structured query language (SQL) database (e.g., a MySQL database, an Oracle database, etc.) or another type of database (e.g., a not only SQL (NoSQL) database). A non-limiting list of NoSQL electronic databases that may be accessed by the database driver 122 bindings includes: Apache Cassandra, Apache CouchDB, Bigtable, MongoDB, and Redis. The electronic databases accessed by the bindings in the database driver 122 may reside in the client computing device 102, the DBMS 104, and/or another location accessible by the network 106. For example, the database driver 122 may access an electronic database via a socket, a persistent network connection, or any other suitable means. In some cases, an electronic database may reside entirely in the memory 114 (i.e., an in-memory database). The database driver 122 may load one or more databases/tables into the in-memory database. Other modules in the memory 114 may use the database driver 122 to access one or more electronic databases. For example, the pricing module 124 may access the database driver 122 to retrieve data from the DBMS 104.

The pricing module 124 includes instructions generating and filtering comparison data sets to facilitate quote pricing. Generally, the pricing module 124 retrieves data from quote and/or invoice tables and applies a set of exclusionary rules to determine a quote price for a particular product. The pricing module 124 may retrieve the data from the quote and/or invoice tables via the database driver 122. For example, the pricing module 124 may recover a quote table entry for a product that was quoted a month prior to the current date. The pricing module 124 may then apply exclusionary rules to the recovered quote table entry based on data received from a customer, current market conditions, certain programs (e.g., eRate program), and/or any other suitable pricing strategy.

The machine learning module 126 includes computer-executable instructions for training and operating one or more machine learning model. In general, the machine learning module 126 may train one or more machine learning (ML) models by establishing a network architecture, or topology, and adding layers that may be associated with one or more activation functions (e.g., a rectified linear unit, softmax, etc.), loss functions and/or optimization functions. One or more types of artificial neural networks may be employed, including without limitation, recurrent neural networks, convolutional neural networks, and/or deep learning neural networks. Data sets used to train the artificial neural network(s) may be divided into training, validation, and testing subsets, and these subsets may be encoded in an N-dimensional tensor, array, matrix, or other suitable data structures. Training may be performed by iteratively training the network using labeled training samples.

Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values. In embodiments, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In embodiments, multiple artificial neural networks may be separately trained and operated, and/or separately trained and operated in conjunction. In embodiments, a Bayesian model may be used to train the ML model.

In embodiments, the one or more ML models may include an artificial neural network having an input layer, one or more hidden layers, and an output layer. Each of the layers in the artificial neural network may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of artificial neural networks are possible. For example, the input layer may correspond to input parameters that are given as full sentences, or that are separated according to word or character (e.g., fixed width) limits. The input layer may correspond to a large number of input parameters (e.g., one million inputs), in some embodiments, and may be analyzed serially or in parallel. Further, various neurons and/or neuron connections within the artificial neural network may be initialized with any number of weights and/or other training parameters. Each of the neurons in the hidden layers may analyze one or more of the input parameters from the input layer, and/or one or more outputs from a previous one or more of the hidden layers, to generate a decision or other output. The output layer may include one or more outputs, each indicating a prediction. In some embodiments and/or scenarios, the output layer includes only a single output.

The DBMS 104 includes a plurality of databases 150, including a first database DB1 through database DBn, wherein n may be any positive integer. Each of the plurality of databases 150 includes a plurality of tables 152 from T1 through Tm, wherein m may be any positive integer. In particular, each of the databases 150 may correspond to a directory/file, and each of the tables 152 may correspond to a file. As the computing device 102 generates or otherwise provides data across the network 106 to the DBMS 104, that data may be stored in one or more files of the databases 150 and/or tables 152. For example, the pricing module 124 may generate quote data and/or invoice data corresponding to one or more goods and/or services for sale that is transmitted or otherwise stored on the DBMS 104 in file of a database 150 and/or table 152. The pricing module 124 may also retrieve quote data and invoice data from the DBMS 104 via the database driver 122. The quote data may represent pricing values generated by the pricing module 124 and provided to a customer as an offer for sale. Similarly, the invoice data may represent pricing values generated by the pricing module 124 that a customer paid for the goods and/or services identified in the invoice data.

The DBMS 104 provides multiplexed access to the databases 150 and the tables 152. The DBMS 104 may be a collection of any tabular data. For example, the DBMS 104 may be implemented as a relational database management (RDBMS) such as MySQL, Oracle, etc. The DBMS may be a set of comma-separated (CSV) values, Microsoft Excel spreadsheets, etc. The DBMS 104 may be implemented in one or more computing devices (e.g., using one or more devices such as the client computing device 102). The DBMS 104 may be implemented using one or more suitable cloud computing service (e.g., using a virtual server, or a hosted virtual database instance that provides access via database bindings but does not provide operating system level access). The server(s) implementing the DBMS 104 may include one or more processor, a NIC, a memory, etc.

Exemplary Data Flow

Figure 2:
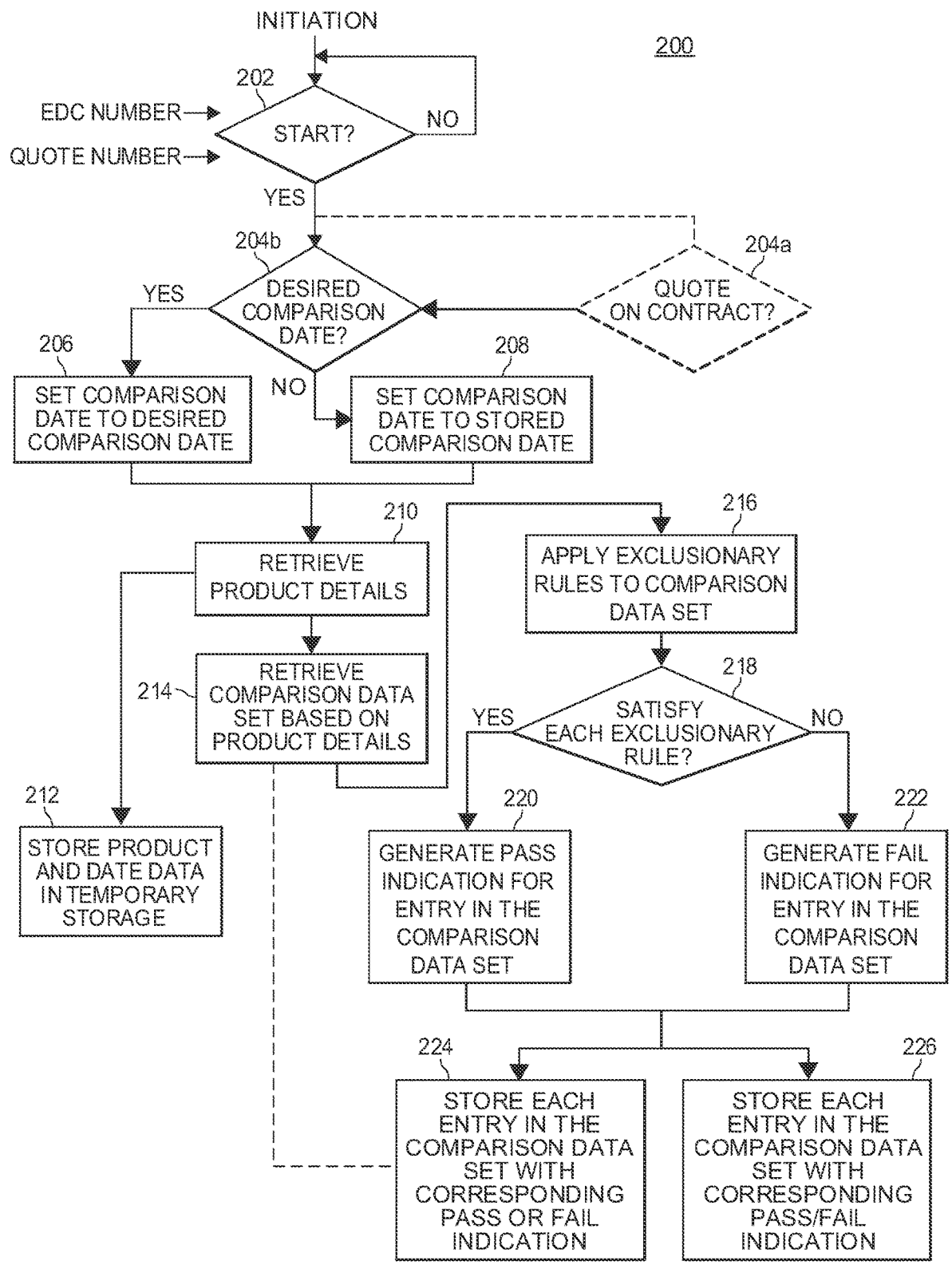
FIG. 2 is a logic diagram representative of an example method for determining lowest corresponding price data, in accordance with embodiments described herein.

FIG. 2 is a logic diagram representative of an example method 200 for determining lowest corresponding price data, in accordance with embodiments. The example method 200 begins (block 202) when a computing device (e.g., computing device 102) receives an initiation signal and either a quote number or an electronic data code (EDC) number (collectively referenced herein as the "initiation data") (YES branch of block 202). However, if the initiation signal or neither of the quote number nor the EDC number is received, the example method 200 may not begin (NO branch of block 202). Generally speaking, the EDC number and/or the quote number may indicate a good and/or service of interest to a customer, and the initiation signal may represent a user or other operator clicking, tapping, swiping, or otherwise interacting with the computing device to signal the beginning of the example method 200. For example, a customer may request a quote for a bulk set of Ethernet cables, and may provide the EDC number corresponding to the particular cables the customer desires. A user, operator, and/or the client may enter this information into the computing device and provide the initiation signal (e.g., click, tap, swipe, etc.) required to initiate the example method 200. Block 202 may be performed by, for example, the CPU 110.

In embodiments, the initiation data may include customer information. The customer information included in these signals may belong to one or more customer categories, and may help focus the search to customers in the same or similar categories (also referenced herein as "similarly situated customers"). For example, a user may enter a quote number as part of the initiation data for the example method 200. The quote number may indicate, inter alia, that the potential/current/past customer is a library, and that the product is a computer keyboard. The library customer may belong to a "non-residential" customers categorization, and the example method 200 may prioritize database information related to similarly situated customers (e.g., libraries, consortiums, schools, etc.). Accordingly, the example method 200 may facilitate categorizing search results based on the customer indicated in any of the initiation signal, the EDC number, and/or the quote number.

Optionally, the method 200 may continue by determining whether the quote requested is based on a contract (optional block 204a). Generally speaking, if a salable unit is promised to a prospective purchaser under a single sale contract, recurring purchase agreement, and/or other sales agreements, the contract price may serve as the quote price. If a user enters a quote number to begin the method 200, the CPU 110 or other suitable processor may automatically retrieve the quote information corresponding to the quote number which may contain a contract status for the salable unit. By contrast, if a user enters an EDC number to begin the method 200, the CPU 110 or other suitable processor may retrieve product information corresponding to the EDC number, but the CPU 110 or other suitable processor may not have any additional information to make a contract status determination. Thus, the present technique allows a user to confirm or deny the contract status of the salable unit indicated in the EDC number. If a user confirms the contract status of the salable unit, the present techniques may further allow a user to enter contract information related to the salable unit. Further, if the user confirms the contract status of the salable unit, the CPU 110 or other suitable processor may search invoice and/or quote databases and tables (e.g., DBMS 104) to identify the contract information associated with the salable unit. Should the user deny the contract status of the salable unit, the CPU 110 or other suitable processor may assume that standard pricing evaluations (e.g., non-contract based) should be used.

The method 200 continues by determining whether a user intends to filter based on a specific comparison date (block 204b). As market trends and other forces change pricing strategies, data associated with prior sales may have diminishing relevance the further in the past the sale occurred. To reduce search time and processing power devoted to scanning for relevant data in invoice or quote databases, the user may choose to search only through recent data. Thus, the present technique allows a user to specify date searching parameters upfront to tailor the search and resulting data to the unique interests of the user, creating a more user-friendly price quoting experience. Block 204b may be performed by, for example, the CPU 110.

Thus, if a user specifies a comparison date (YES branch of block 204b), the example method 200 continues by setting the comparison date to the user's desired comparison date (also referenced herein as a "date threshold") (block 206). By contrast, if the user does not have a particular comparison date in mind (NO branch of block 204b) and/or otherwise fails to specify a comparison date, the example method 200 continues by setting the comparison date to a stored comparison date (block 208). The stored comparison date may be stored in memory (e.g., memory 114), and may represent a compromise between adequate sample size and data relevance. Users may want multiple data points from which to determine a suitable price quote, but may not want to examine data beyond a certain date. Thus, the stored comparison date may be a static timeframe (e.g., X number of years from the current date), and may change based on the product and/or customer indicated in the initiation data. For example, the stored comparison date may be 3 years for products with volatile markets, and 1 year for products with less volatile markets. Customers with consistent buying habits/patterns may have a shorter comparison date (e.g., 6 months) as opposed to customers with infrequent, erratic, and/or otherwise inconsistent buying habits/patterns (e.g., 5 years).

Additionally, the stored comparison date may be compared to a user's desired comparison date. A user may input a desired comparison date of 3 months when quote pricing a product with a volatile market. The computing device executing the example method 200 (e.g., computing device 102, CPU 110, etc.) may then retrieve comparison data corresponding to the product within the 3 month desired comparison date range. However, the computing device may not find any comparison data corresponding to the product within the 3 month range, and/or the data found may be erratic/inconsistent due to the volatile market forces. In an attempt to retrieve relevant comparison data and avoid user frustration caused by returning an error message or no price quote, the computing device may adopt the stored comparison date associated with the product and re-run the comparison data retrieval. In the above example, the computing device may change the comparison date to the stored comparison date for the product (e.g., 3 years), and re-evaluate the quote, invoice, etc. tables/databases to retrieve comparison data for the product. Thus, it is to be understood that the stored comparison date may be of any suitable length (e.g., years, months, days, etc.), may be calculated/updated in any suitable manner (e.g., real-time, static, etc.), and may be based on any suitable characteristics (e.g., customer information, product information, etc.).

In any event, the example method 200 continues by retrieving product details corresponding to the initiation data (block 210). The computing device may retrieve product details stored in internal memory (e.g., memory 114), external databases (e.g., DBMS 104) via the database driver 122, and/or any combination thereof. The product details may generally include descriptive information regarding the product identified via the initiation data. Once entered as part of the initiation data, the computing device may search quote tables/databases to retrieve product details corresponding to the identified product, such as product name, classification, current inventory, etc. For example, a user may input an EDC number as part of the initiation data that identifies a particular mousepad sold by a provider. The computing device may then search quote tables/databases to match the EDC number with an entry in the quote tables/databases. The computing device may locate a matching EDC number in the quote tables/databases that identify the particular mousepad with a particular product name, how many of the particular mousepads the provider currently has in their inventory, etc. Block 210 may be performed by, for example, the CPU 110.

The example method 200 continues by storing the product details and date data in temporary storage (block 212). As previously mentioned, the tables/databases used to store information such as comparison dates and product details may be quite large and can reduce processing efficiency when used directly for reference. The date data, such as the current date and the comparison date, and the product details may be required for the remainder of the example method 200. Thus, to avoid referencing the larger tables/databases containing this data and increase processing efficiency, the particular date data and product details associated with any current iteration of the example method 200 may be transferred to temporary storage. The temporary storage may be a table or database that is devoted partially or entirely to the storage of the product details and date data corresponding to a single iteration of the example method 200.

Moreover, after the quote pricing is complete, the date data and product details may be wiped from the temporary storage to minimize the amount of data contained in the temporary storage during each iteration of the example method 200. As such, the temporary storage may contain far less data than the tables/databases containing all of the comparison dates and product details, which in turn, reduces the demand on processing resources. Block 212 may be performed by, for example, the CPU 110.

Using the product details, the example method 200 continues by retrieving a comparison data set based on the product details and the date data (block 214). Generally, the comparison data set may contain quote and/or sale information within the range specified by the date data and associated with products similar and/or identical to the product identified in the product details. The quote and/or sale information may indicate what a similar and/or identical product was quoted and/or sold for in the past, and may further indicate the customer to which the product was sold. Block 214 may be performed by, for example, the CPU 110.

The computing device may search through, for example, invoice reporting tables/databases to analyze past sales of similar and/or identical products. If a particular entry in the invoice reporting tables/databases is within the date range specified by the comparison date and is associated with a similar and/or identical product as the product identified in the product details, the computing device may retrieve the particular entry from the invoice reporting tables/databases and input the particular entry into the comparison data set. The comparison data set may be maintained in temporary storage, similar to the product details and date data.

To illustrate, assume the product identified by the product details is a first brand keyboard and the comparison date is 2 years from the current date. The computing device may access the invoice reporting tables/databases (e.g., as maintained on the DBMS 104) to analyze the data entries maintained therein. The computing device may identify a first brand keyboard invoiced 1.5 years prior to the current date, a first brand mouse invoiced 1 year prior to the current date, and a second brand keyboard invoiced 0.5 years prior to the current date. Each identified entry may be pulled from the invoice reporting tables/databases and placed in temporary storage as part of the comparison data set.

Notably, the first brand mouse is not an identical product to the first brand keyboard nor is the second brand keyboard, but the computing device may identify these entries as close enough to the first brand keyboard to be relevant. If, for example, the first brand keyboard invoiced 1.5 years prior to the current date is the most recent invoiced first brand keyboard, the computing device may determine that a more recent entry should be included in the analysis. Thus, despite their differences from the first brand keyboard, the first brand mouse and second brand keyboard entries may be identified because they are similar enough to the first brand keyboard and both were invoiced closer to the current date than any other invoiced first brand keyboard.

The example method 200 continues by applying a set of exclusionary rules to the comparison data set (block 216). Generally speaking, each rule in the set of exclusionary rules may represent a particular element of a pricing strategy. Namely, each rule may be oriented to filter out certain entries included in the comparison data set. For example, the set of exclusionary rules may include a 0 cost product rule, wherein any entry in the comparison data set featuring a 0 corresponding to the product cost should be excluded from the comparison data set. As another example, the set of exclusionary rules may include a price below cost rule, wherein any entry in the comparison data set featuring a price that is less than the associated cost should be excluded from the comparison data set. In embodiments, the pricing strategy may be one of a set of pricing strategies that may be stored in memory (e.g., memory 114), or otherwise accessible by a computing device (e.g., computing device 102). Block 216 may be performed by, for example, the pricing module 124.

As yet another example, the set of exclusionary rules may include certain universal rules, which may represent broader concerns beyond a particular pricing strategy. Providers may not wish to compare certain brand products to other competing brands for certain product categories/types. Additionally, providers may wish to participate in programs that have established pricing rules for participation (e.g., FCC eRate program). Accordingly, the set of exclusionary rules may include one or more rules defining which brand cannot be compared to other brands within certain product categories/types and one or more rules defining the rules for participation in the program.

The example method 200 continues by evaluating whether each entry in the comparison data set satisfies each exclusionary rule (block 218). Block 218 may be performed by, for example, the CPU 110. Should a particular entry in the comparison data set satisfy each exclusionary rule (YES branch of block 218), then the example method 200 continues by generating a pass indication for the particular entry in the comparison data set (block 220). Generally speaking, the pass indication indicates to a user that the entry displayed as part of the comparison data set satisfies each of the exclusionary rules, and may therefore be a useful reference point when generating a price quote for the specified product. Referencing the example above, the first brand keyboard invoiced 1.5 years prior to the current date may satisfy each exclusionary rule and receive a pass indication. Thus, a user may view the first brand keyboard invoice along with the pass indication and understand that the details of the invoice may be trusted as relevant data from which the user may determine a comparable price quote. Block 220 may be performed by, for example, the CPU 110.

By contrast, should a particular entry in the comparison data set fail to satisfy each exclusionary rule (NO branch of block 218), then the example method 200 continues by generating a fail indication for the particular entry in the comparison data set (block 222). As an example, assume for a particular iteration of the example method 200 that the set of exclusionary rules includes 5 exclusionary rules. Further assume that a particular entry in the comparison data set does not satisfy 1 of the 5 exclusionary rules. In this circumstance, the particular entry fails to satisfy each exclusionary rule, such that the computing device generates a fail indication corresponding to the particular entry. Block 222 may be performed by, for example, the CPU 110.

However, it should be understood that the fail indication may represent a particular entry failing to satisfy any suitable number of the exclusionary rules. Moreover, the number of exclusionary rules a particular entry must satisfy may change for different iterations of the example method 200. In reference to the above example, the computing device may generate a fail indication if the particular entry fails to satisfy at least 3 of the 5 exclusionary rules. In pricing strategies with a large number of exclusionary rules, the computing device may generate a fail indication if the particular entry fails to satisfy at least a majority of the exclusionary rules. Similarly, in embodiments, the computing device may generate a fail indication if the particular entry fails to satisfy at least one exclusionary rule.

The example method 200 continues by storing each entry in the comparison data set and their corresponding pass or fail indications (block 224). Typically, these entries may be made in long-term storage (e.g., DBMS 104) to allow the computing device to retrieve these comparison data sets upon subsequent iterations of the example method 200. Analyzing large quantities of data, such as the quote and/or invoice reporting tables/databases is processor intensive. As such, it is advantageous to store the completed search results to allow the processors to simply retrieve a completed search without re-performing the search. Block 224 may be performed by, for example, the database driver 122 and DBMS 104.

However, each comparison data set may only be relevant for a certain duration because the market forces and other influences causing each entry in the comparison data set to be relevant may unexpectedly cause each entry to fade into irrelevance. Consequently, in embodiments, each comparison data set may be stored with a duration indication to identify how long the comparison data set should be maintained in long-term storage. After the duration indicated in the duration indication passes, the associated comparison data set may be wiped/deleted from and/or otherwise removed from long-term storage.

In embodiments, and as discussed further herein, the comparison data sets stored at block 224 may be compared with, for example, invoice data retrieved from invoice reporting tables/databases, such as at block 214. As previously mentioned, each entry in a particular comparison data set that receives a pass indication may represent a viable pricing option (e.g., lowest corresponding price) for a particular product. However, these entries may not always accurately correspond to the actual sales price for the quoted product. Once the quoted product is sold, the invoice associated with the quoted product can be compared to the particular comparison data set to determine the accuracy for each entry receiving a pass indication. This optional action may be performed by, for example, the machine learning model 126 via the database driver 122.

The example method 200 continues by displaying each entry in the comparison data set along with the corresponding pass or fail indication (block 226). Generally, the display may take place on any device suitable to allow a user to view and/or interact with the displayed data. For example, a computing device may display the comparison data set in a table format, and may display each relevant data point in a separate column or row (e.g., product name, customer name, lowest corresponding price, pass/fail indication, etc.). In embodiments, a user may be able to click, tap, swipe, and/or otherwise interact with the computing device to modify the display. The user may click the pass/fail indication for a particular entry, and in response, the computing device may modify the display to show why the entry pass or failed (e.g., the entry did not satisfy all exclusionary rules, highlighting which rules were satisfied/unsatisfied, etc.). Block 226 may be performed by, for example, the computing device 102 or the output device 142. Once the comparison data set is displayed to a user, the example method 200 may end (block 228).

Example Method to Generate Lowest Corresponding Price Data

Figure 3:
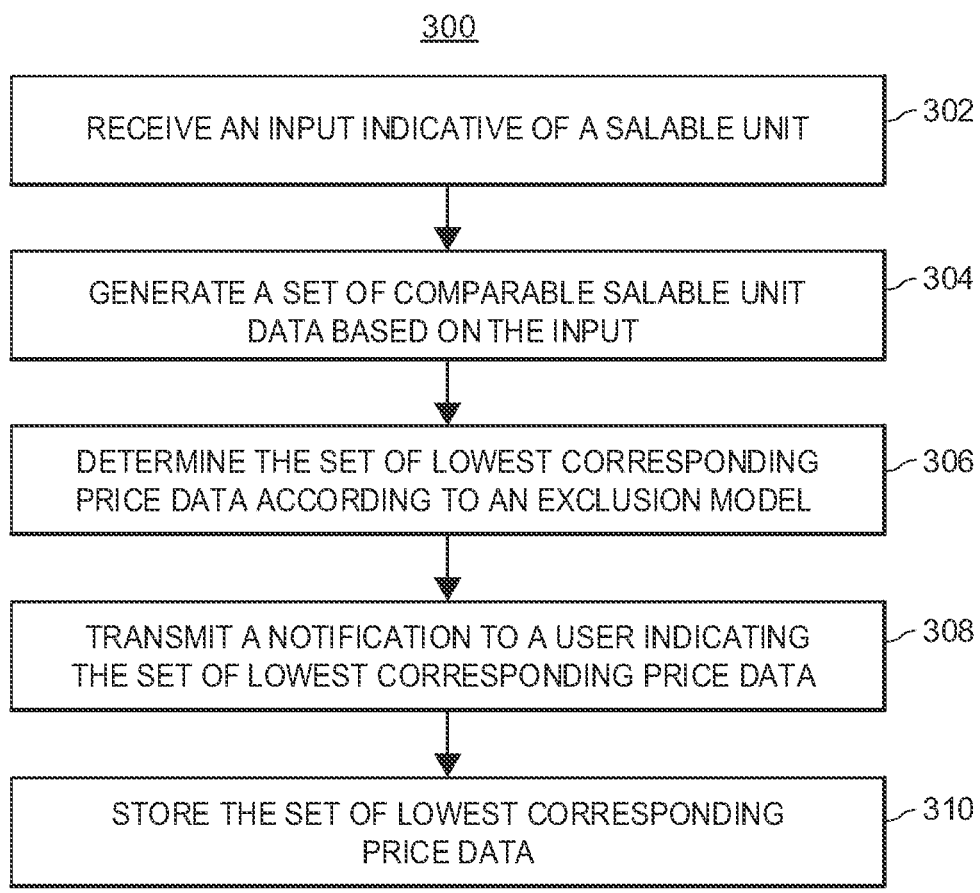
FIG. 3 is a flow diagram of an example method for determining lowest corresponding price data, in accordance with embodiments described herein.

FIG. 3 is a flow diagram of an example method 300 for determining lowest corresponding price data (block 302). The example method 300 begins by receiving an input indicative of a salable unit. The input may include a current date, and the salable unit may be a good and/or service for sale by a commercial provider. For example, a large-scale commercial goods and services provider may have salable units including computer equipment/peripherals, network hardware, computer software, etc. Generally, a user may provide the input at a computing device (e.g., computing device 102), and the user may be remotely connected via a network that routes the user's input to a host server and/or computing device for processing. As an example, a user may provide an input requesting a price quote for a first brand keyboard. Block 302 may be performed by, for example, the CPU 110.

The example method 300 continues by generating a set of comparable salable unit data based on the received input (block 304). Each respective comparable salable unit data in the set of comparable salable unit data may include a respective prior date within a date threshold from the current date. Continuing the example above, a respective comparable salable unit data may indicate a first brand keyboard sold 1 year prior to the current date. Moreover, the user may input a desired comparison date of 2 years from the current date, such that the respective comparable salable unit data indicating the first brand keyboard may satisfy the date threshold. Block 304 may be performed by, for example, the CPU 110 and database driver 122.

In embodiments, generating the set of comparable salable unit data may include incorporating a recent comparable salable unit data into the set of comparable salable unit data. The recent comparable salable unit data may include a recent prior date within the date threshold from the current date. Further, the computing device may remove any respective comparable salable unit data from the set of comparable salable unit data wherein the respective prior date of the respective comparable salable unit data exceeds the date threshold from the current date. Generally speaking, once a product is quoted, a sale of that product may take place soon thereafter. Thus, a computing device may analyze recent quote data when generating the set of comparable salable unit data and identify a quote for a similar product. The computing device may then expect a set of invoice data corresponding to the recent quote data to provide a sale price for the similar product. However, the invoice reporting tables/databases may not include the corresponding set of invoice data because the sale corresponding to the recent quote may not have yet taken place, or the corresponding set of invoice data may not have been entered into the invoice reporting tables/databases. To avoid providing an incomplete data set, the computing device may delay finalizing the set of comparable salable unit data, or the computing device may automatically update the set of comparable salable unit data once the corresponding set of invoice data is accessible.

For example, a computing device may receive a request to price quote a first brand keyboard. The computing device may analyze recent quote data and determine that a first brand keyboard was quoted three days prior to the current date, but that no invoice data corresponding to this quote data exists in the invoice reporting tables/databases. The invoice data corresponding to the quote data may arrive one day after the computing device generates the price quote for the first brand keyboard. Accordingly, the computing device may automatically provide an update to a user comprising the invoice data corresponding to the quote data the next day when the invoice reporting tables/databases are updated to reflect the recent sale of the first brand keyboard.

Similarly, the computing device may analyze the quote tables/databases and/or invoice reporting tables/databases to determine entries that do not satisfy the date threshold of the current inquiry. As previously mentioned, accessing and analyzing data within massive databases can rapidly consume processing resources, such that reducing data source size can prove tantamount to an increase in processing efficiency. Once a user specifies a date threshold or the computing device implements a predetermined date threshold, the computing device may then automatically eliminate data entries that do not satisfy the date threshold. Such a blanket elimination of data entries may provide two-fold reductions in the required processing resources as the data source size is immediately reduced substantially, and no processing resources are expended to analyze any of the eliminated data entries beyond identifying that each entry does not satisfy the date threshold. Moreover, the date threshold provides an inherently advantageous filter because many quote and invoice reporting tables/databases are sorted/organized by date. This allows the processing resources to merely identify the first entry that fails to satisfy the date threshold and eliminate all subsequent entries.

The example method 300 continues by determining a set of lowest corresponding price data according to an exclusion model (block 306). Generally speaking, the set of lowest corresponding price data may refer to a set of suggested price quotes for a product based on a prior invoice, quote, and/or other suitable data. The computing device may analyze the invoice reporting tables/databases, quote tables/databases, and other suitable data sources to determine prior price quotes and/or prior successful sale prices of an identical or similar product (e.g., the set of comparable salable unit data). Applying the exclusion model to this set of data may filter out data that does not correspond to an ideal or "best" price for the particular product identified in the data. Block 306 may be performed by, for example, the pricing module 124.

For example, assume the set of comparable salable unit data includes two invoice entries for a first brand security software. A first invoice entry for the first brand security software made 2 months prior to the current date may indicate a sales price of $30, and a second invoice entry for the first brand security software made 1 month prior to the current date may indicate a sales price of $25. The exclusion model may filter out the first invoice entry because it indicates a higher price for the same first brand security software indicated in the second invoice entry. However, it is to be understood that the exclusion model may include rules/filters associated with any suitable characteristic of the set of comparable salable unit data.

As another example, assume the set of comparable salable unit data includes two invoice entries for a second brand security software. Further assume that the input provided by a user indicates the price quote is for a not-for-profit small entity (e.g., less than 250 employees). A first invoice entry for the second brand security software made 2 months prior to the current date may indicate a sales price of $30 to a for-profit large entity (e.g., more than 5,000 employees), and a second invoice entry for the first brand security software made 1 month prior to the current date may indicate a sales price of $25 to a not-for-profit small entity. The exclusion model may filter out the first invoice entry because it indicates a sale to a dissimilar entity, and the model may keep the second invoice entry because it indicates a sale to a similar entity (e.g., a similarly situated customer).

In embodiments, the exclusion model may include several static rules across each price quote. Generally, these rules may identify data entries that should not be used when determining a price quote, and the rules may apply to both the salable unit indicated in the input as well as data entries in the set of comparable salable unit data. More specifically, the exclusion model may include rules to determine whether the salable unit indicated in the input is part of a bid, and to identify the contract status of the salable unit at the time of the input. The exclusion model may also include rules to filter out data entries in the set of comparable salable unit data that include a 0 cost entry, a 0 price entry, a price that is below cost, and/or other suitable rules or combinations thereof. Accordingly, the computing device may determine (i) a cost of each comparable salable unit data, (ii) a price of each comparable salable unit data, (iii) a bid status of the salable unit, and (iv) a contract status of the salable unit.

In embodiments, each respective lowest corresponding price data in the set of lowest corresponding price data may include a pass indication or a fail indication. Ultimately, a price quote generated by the user providing the input may be based on the data presented in the set of lowest corresponding price data. Thus, it is important to indicate to the user which data may be most relevant to their situation when the user is deciding a price to quote to a customer.

The pass and/or fail indication satisfies this need by providing the user a succinct, readily-understandable indication of a lowest corresponding price data's relevance. The pass indication may identify for a user, for example, that a particular LCP data entry satisfied each exclusionary rule included in the exclusion model, or any suitable number of rules included in the exclusion model. The fail indication may identify for a user, for example, that a particular LCP data entry did not satisfy each exclusionary rule included in the exclusion model, or any suitable number of rules included in the exclusion model. Of course, the pass and/or fail indication may present this information to a user in any suitable manner, such as a numerical score (e.g., 1-10), a graphical depiction of a position on a scale, a color-based scheme (e.g., red=fail indication, green=pass indication, etc.), and/or any other suitable representation scheme or combination thereof.

In embodiments, the exclusion model is a machine learning model, and may be stored and/or executed by a machine learning module (e.g., machine learning module 126). Generally, machine learning may involve identifying and recognizing patterns in existing data (such as invoice data, quote data, bid data, etc.) in order to facilitate making predictions for subsequent data (again, such as invoice data, quote data, bid data, etc.). Machine learning models may be created based upon example inputs of data in order to make valid and reliable predictions for novel inputs.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In embodiments, machine learning techniques may be used to extract the set of comparable salable unit data, and determine the set of lowest corresponding price data.

For example, one or more processors (e.g., CPU 110) may train a machine learning model (e.g., included in machine learning module 126) based upon (i) a set of prior inputs, (ii) a set of prior comparable salable unit data, and (iii) a set of prior lowest corresponding price data. Further, the one or more processors may apply the machine learning model to the set of comparable salable unit data to generate the set of lowest corresponding price data. The machine learning programs may utilize deep learning algorithms are primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

The machine learning models may be trained with the set of prior inputs, the set of comparable salable unit data, and the set of prior lowest corresponding price data to identify relationships between and among inputs, salable unit data (e.g., invoice and quote data), and lowest corresponding price data. Accordingly, upon receipt of the input, the machine learning module 126 may apply the machine learning models to determine a set of lowest corresponding price data.

The example method 300 continues by transmitting a notification of the set of lowest corresponding price data for display to a user (block 308). The notification may indicate a lowest corresponding price for each lowest corresponding price data. For example, the notification may be transmitted to an output device (e.g., output device 142) where the user may view and/or interact with the displayed set of lowest corresponding price data. The displayed set of lowest corresponding price data may include a product name, product number (e.g., EDC number), sale price, quoted price, cost, pass/fail indication, sale/quote date, and/or any other suitable data or combination thereof. Block 308 may be performed by, for example, the NIC 112.

The example method 300 continues by storing the set of lowest corresponding price data into an historical transaction log (block 310). Generally, each set of lowest corresponding price data provides influential pricing data to a user when they determine a price quote for a particular product. If this data is catalogued, then it can later be accessed and analyzed to provide insight as to how price quoting decisions are generally made, and why a quoted price may not have resulted in a sale. Accordingly, the historical transaction log may be long-term storage, such as the DBMS 104, where the set of lowest corresponding price data may not be wiped upon each iteration of the example method 300. Block 310 may be performed by, for example, the DBMS 104.

It is to be understood that the actions described in reference to FIG. 3 may be performed in any suitable order and any suitable number of times to achieve a desired result.

Example Method to Automatically Confirm Invoiced Salable Units

Once a quote is processed and provided to a customer, a provider may expect a sale sometime thereafter. This sale may be documented in an invoice, that is typically generated by the provider and stored in the invoice reporting tables/databases. However, if the historical transaction logs document a price quote for which there is no corresponding invoice, then the price quote may not have resulted in a sale. A provider may wish to understand why such instances occur, and may thus analyze the set of lowest corresponding price data provided to a user that did not produce a sale. Additionally, a provider may periodically check invoice reporting tables/databases to confirm invoiced salable units to receive consistent feedback concerning the fidelity of their price quoting.

Figure 4:
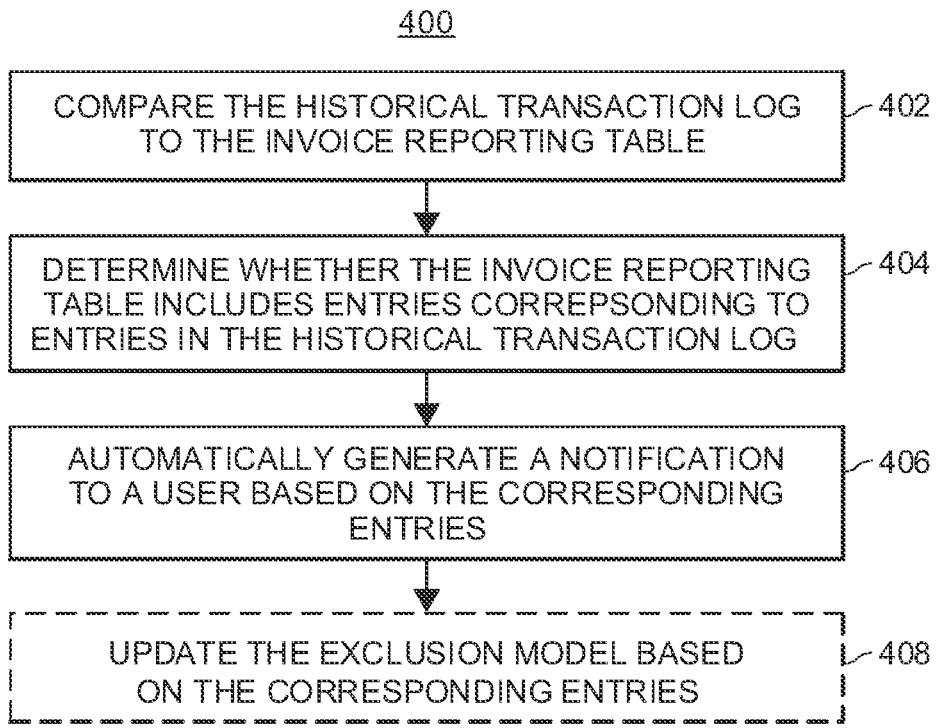
FIG. 4 is a flow diagram of an example method for automatically confirming invoiced salable units based on quoted salable units in an historical transaction log, in accordance with embodiments described herein.

FIG. 4 is a flow diagram of an example method 400 for automatically confirming invoiced salable units based on quoted salable units in an historical transaction log (e.g., databases 150 and/or tables 152). The example method may 400 begin by comparing the stored data in the historical transaction log to data stored in the invoice reporting tables/databases to determine mismatches (block 402). Each entry in the historical transaction log and the invoice reporting tables/databases may include a timestamp, indicating when each entry was made in the respective storage entity. Moreover, the user (e.g., commercial goods/services provider) may establish a duration after which the comparison of the historical transaction log and the invoice reporting tables/databases may take place. For example, a user may establish a duration of 1 week, such that the comparison of the historical transaction log and the invoice reporting tables/databases takes place each week. Block 402 may be performed by, for example, the CPU 110 and database driver 122.

In any event, a computing device may access the historical transaction log to retrieve a first set of entries made during a duration. Similarly, the computing device may access the invoice reporting tables/databases to retrieve a second set of entries made during the duration. Once both data sets are obtained, the computing device may analyze the dates of each set of entries in an attempt to match each set of historical lowest corresponding price data (e.g., from the historical transaction log) with a corresponding entry from the invoice reporting tables/databases. In general, invoices may be delayed with respect to their corresponding set of lowest corresponding price data because the sales related to the quotes generated based on the lowest corresponding price data may take place days, weeks, etc. after the lowest corresponding price data is generated and stored in the historical transaction log. Thus, the computing device may match a set of lowest corresponding price data to a respective invoice by evaluating the similarity of products referenced therein and an expected date differential. The computing device may additionally categorize or generate a likelihood score for each pairing based on the relative strength of the information contained in both sets of data. Of course it will be appreciated that the computing device may analyze the invoices and sets of lowest corresponding price data in any suitable manner to relate respective entries in both data sets, including machine learning techniques described herein.

For example, assume a set of lowest corresponding price data includes multiple entries of a first brand computer monitor with a lowest corresponding price value of $100 and a timestamp indicating the data was generated on Monday. Further assume an invoice includes a sale of the first brand computer monitor for $100 and a timestamp indicating the invoice was generated on Thursday of the same week as the first brand computer monitor lowest corresponding price data. A computing device may process the identical price (e.g., $100) for the identical product (e.g., the first brand computer monitor) and a date separation consistent with an expected timeline from quote to sale (e.g., 3 days) and generate a high likelihood score/confidence interval relating the two data sets.

By contrast, assume a set of lowest corresponding price data includes multiple entries of a second brand security software package with a lowest corresponding price value of $65 and a timestamp indicating the data was generated on Tuesday. Further assume an invoice includes a sale of a first brand computer monitor for $100 and a timestamp indicating the invoice was generated on Monday of the same week as the second brand security software package lowest corresponding price data. A computing device may process the different prices (e.g., $65 and $100) for dissimilar products (e.g., the second brand security software package and the first brand computer monitor) and a date separation inconsistent with an expected timeline from quote to sale (e.g., this invoice took place prior to the lowest corresponding price data generation) and generate a low likelihood score/confidence interval relating the two data sets.

The example method 400 continues by comparing the first set of entries to the second set of entries to determine whether each first entry in the first set of entries is substantially similar to a second entry in the second set of entries (block 404). Generally, an entry from the first set of entries may rarely identically match an entry from the second set of entries. A computing device may compare the likelihood score/confidence interval generated for pairs of first entries and second entries to a confidence threshold to accommodate differences between the lowest corresponding price data and the invoices. If a likelihood score/confidence interval for any pair of first entry and second entry exceeds the confidence threshold, the computing device may confirm the sale of a quoted salable unit. Block 404 may be performed by, for example, the CPU 110.

The example method 400 continues by automatically generating a notification to a user based on the first and second sets of entries (block 406). More specifically, once the computing device evaluates each entry in the historical transaction log with a timestamp within the duration, the computing device may generate a notification for display to a user associated with the evaluation. In embodiments, the notification may indicate a respective first entry responsive to determining that the respective first entry is not substantially similar to a respective second entry. Block 406 may be performed by, for example, the CPU 110.

As an example, the computing device may access the historical transaction log and identify a first set of entries, each first entry timestamped within the duration, one of which is related to quoted/invoiced prices for one or more brands/types of video conferencing equipment. The computing device may further access the invoice reporting tables/databases and identify a second set of entries, each second entry timestamped within the duration, all related to networking equipment (e.g., Ethernet switches, modems, routers, network interface adapters, etc.), computer hardware, and security software. The computing device may compare each first entry to each second entry and, as part of that analysis, determine that none of the likelihood scores/confidence intervals associated with any of the pairings of the video conferencing equipment first entry with any of the second entries exceeds the confidence threshold. Thus, the computing device may determine that the video conferencing equipment set of lowest corresponding price data did not result in a completed sale.

The computing device may generate a notification for display to a user including any of the data used in the evaluation. In embodiments, the computing device may include all entries from both the first and second sets of entries in a notification, and highlighting those that are paired (e.g., those first entries that resulted in a sale/a corresponding second entry). Additionally or alternatively, the computing device may only include those first entries without a corresponding second entry. In this manner, a user may immediately identify the sets of lowest corresponding price data that did not result in a completed sale. It is to be understood that the notification may include any entries from the first and/or second sets of entries, and may display the entries in any suitable manner or combination thereof.

The example method 400 continues by optionally updating the exclusion model based on the corresponding entries. In general, the fact that a set of lowest corresponding data did not result in a completed sale (as represented by an invoice) may motivate a commercial goods/services provider to examine the reasons why. Conveniently, in embodiments where the exclusion model is a machine learning model, the machine learning model may analyze the sets of lowest corresponding price data that did not result in a completed sale in an attempt to develop correlations between and among similar results and those that did result in completed sales. The machine learning model may then adjust the exclusion rules applied to the set of comparable salable unit data, adjust the types of quote/invoice data entries are included in the set of comparable salable unit data, and/or any other suitable adjustment or combination thereof.

It is to be understood that the actions described in reference to FIG. 4 may be performed in any suitable order and any suitable number of times to achieve a desired result. In embodiments, the example method 400 may be performed periodically each time a subsequent duration passes with respect to a prior duration. For example, if the specified duration is one week, then the example method 400 may be performed each week. Moreover, upon each iteration, the computing device may incorporate each respective first entry that is not substantially similar to a respective first entry into the machine learning model. For example, each first entry that does not have a likelihood score/confidence interval with any of the second entries exceeding the confidence threshold, the computing device may incorporate the first entry into the machine learning model by developing correlations between and among the first entry data and other first entry data and/or second entry data.

Example Method to Identify LCP Data Anomalies

Occasionally, a price quote may not be generated for a completed sale. In these instances, an invoice may still be generated and stored in the invoice reporting tables/databases. Alternatively, such an invoice may be erroneously entered into the invoice reporting tables/databases as a duplicate entry or a misidentified/mislabeled entry. The computing device may recognize these anomalous entries, notify a user to their presence, and utilize these entries to enhance the exclusion model.

Figure 5:
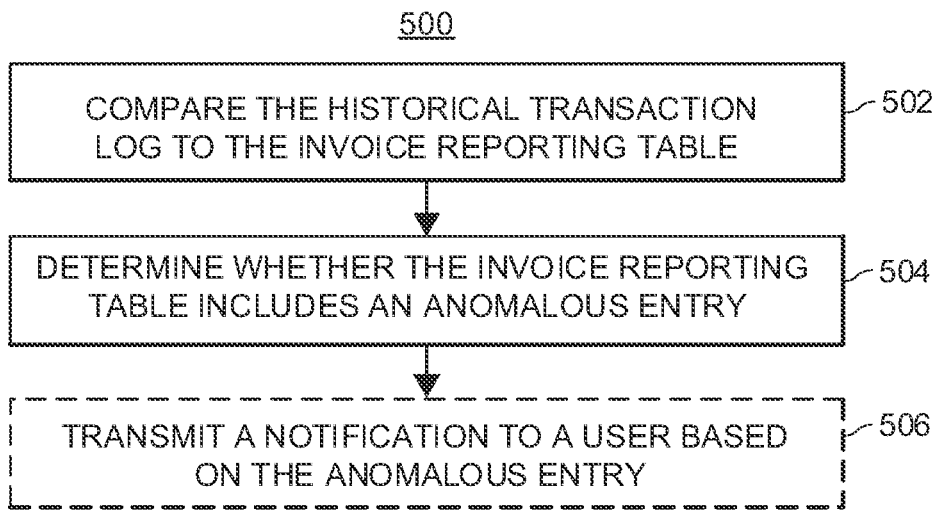
FIG. 5 is a flow diagram of an example method for identifying anomalies within the lowest corresponding price data, in accordance with embodiments described herein.

FIG. 5 is a flow diagram of an example method 500 for identifying anomalous entries within the lowest corresponding price data. The example method 500 begins by comparing the historical transaction log to the invoice reporting tables/databases (block 502). As previously described, the computing device may analyze each entry in the historical transaction log and the invoice reporting tables/databases to determine whether each entry in either set has a corresponding entry in the other set. Block 502 may be performed by, for example, the CPU 110.

If the computing device determines that a respective entry in the invoice reporting tables/databases does not have a corresponding entry in the historical transaction log, then the computing device may determine that the respective entry is an anomalous entry (block 504). Block 504 may be performed by, for example, the CPU 110.

For example, the computing device may access the invoice reporting tables/databases and identify a respective entry related to a first brand/type of network management software. The computing device may further access the historical transaction log and identify a set of entries all related to cybersecurity services, power adapters, and dot-matrix printers. The computing device may compare the respective entry to each entry from the historical transaction log and, as part of that analysis, determine that none of the likelihood scores/confidence intervals associated with any of the pairings of the respective entry with any of the historical transaction log entries exceeds the confidence threshold. Thus, the computing device may determine that the respective entry is an anomalous entry in the invoice reporting tables/databases.

Accordingly, the computing device may proceed to notify a user of the anomalous entry's existence and/or incorporate the anomalous data into the exclusion model. For example, the example method 500 may optionally continue by transmitting a notification to a user based on the anomalous entry (block 506). The notification may include all information included in the anomalous entry, such as the timestamp, the product identifier, the sale price, the cost, etc. Moreover, the computing device may check the other invoice reporting tables/databases data collected within the same duration as the anomalous data and/or all invoice entries (e.g., as maintained on the DBMS 104) to determine if the anomalous data is a duplicate entry. Block 506 may be performed by, for example, the CPU 110 and/or NIC 112.

Similarly, the computing device may check the historical transaction log entries to determine if any of the anomalous entries are simply mislabeled/misidentified. In general, the computing device may make this determination by determining a number of unpaired historical transaction log entries. For example, if there are two anomalous entries in the invoice reporting tables/databases and two unpaired historical transaction log entries, the computing device may analyze the anomalous entries to determine whether an aspect of the anomalous entries (e.g., product identifier, cost, etc.) is mislabeled/misidentified.

In embodiments where the exclusion model is a machine learning model, the computing device may apply the machine learning model to and/or otherwise incorporate the anomalous data in an attempt to develop correlations between and among the anomalous data, the other invoice data, the historical transaction log data, and all prior data used to train the machine learning model. Moreover, it is to be understood that the actions described in reference to FIG. 5 may be performed in any suitable order and any suitable number of times to achieve a desired result.

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method for determining a set of lowest corresponding price data related to a salable unit, executed by at least one processor of a computer, comprising:
   receiving an input indicative of the salable unit, the input including a current date;
   generating a set of comparable salable unit data based on the input, wherein each respective comparable salable unit data in the set of comparable salable unit data includes a respective prior date within a date threshold from the current date;
   storing the set of comparable salable unit data in a temporary storage table;
   accessing the temporary storage table to determine the set of lowest corresponding price data by applying an exclusion model to the set of comparable salable unit data, wherein the exclusion model is a machine learning model trained with (i) a set of prior inputs, (ii) a set of prior comparable salable unit data, and (iii) a set of prior lowest corresponding price data and is configured to output the set of lowest corresponding price data;
   responsive to determining the set of lowest corresponding price data, wiping the set of comparable salable unit data from the temporary storage table;
   transmitting a notification of the set of lowest corresponding price data for display to a user, the notification indicating a lowest corresponding price for each lowest corresponding price data;
   storing the set of lowest corresponding price data into an historical transaction log;
   determining whether an invoice reporting table includes an anomalous entry by:
      comparing each entry in the invoice reporting table with the historical transaction log, and
      determining a respective entry in the invoice reporting table that does not have a corresponding set of lowest corresponding price data in the historical transaction log is the anomalous entry;
   responsive to determining that the invoice reporting table includes the anomalous entry, transmitting a notification to a user indicating the anomalous entry; and
   periodically updating the exclusion model by:
      retrieving entries from the historical transaction log and corresponding entries from the invoice reporting table,
      comparing the entries from the historical transaction log with the corresponding entries from the invoice reporting table, and
      training the exclusion model using each entry from the historical transaction log that does not satisfy a confidence threshold when analyzed in tandem with at least one corresponding entry—from the invoice reporting table as inputs to output a subsequent set of lowest corresponding price data.

2. The method of claim 1, further comprising:
   incorporating a recent comparable salable unit data into the set of comparable salable unit data, the recent comparable salable unit data including a recent prior date within the date threshold from the current date; and
   removing any respective comparable salable unit data from the set of comparable salable unit data wherein the respective prior date of the respective comparable salable unit data exceeds the date threshold from the current date.

3. The method of claim 1, wherein the set of comparable salable unit data is generated based on the invoice reporting table, and the method further comprises:
   (a) accessing the historical transaction log to retrieve a first set of entries made during a duration;
   (b) accessing the invoice reporting table to retrieve a second set of entries made during the duration;
   (c) comparing the first set of entries to the second set of entries to determine whether each first entry in the first set of entries satisfies the confidence threshold when analyzed in tandem with a second entry in the second set of entries; and
   (d) responsive to determining that a respective first entry does not satisfy the confidence threshold when analyzed in tandem with a respective second entry, transmitting a notification to a user indicating the respective first entry.

4. The method of claim 3, wherein the method further comprises:
   periodically performing steps (a)-(d) each time the duration elapses following a prior duration; and
   updating the exclusion model upon each iteration of steps (a)-(d) by incorporating each respective first entry that is not substantially similar to a respective second entry.

5. The method of claim 1, wherein the set of comparable salable unit data is generated based on the invoice reporting table.

6. The method of claim 1, wherein applying the exclusion model includes determining (i) a cost of each comparable salable unit data, (ii) a price of each comparable salable unit data, (iii) a bid status of the salable unit, and (iv) a contract status of the salable unit.

7. The method of claim 1, wherein each respective lowest corresponding price data in the set of lowest corresponding price data includes a pass indication or a fail indication.

8. A system for determining a set of lowest corresponding price data related to a salable unit, comprising:
   a memory storing computer-readable instructions that, when executed, cause the one or more processors to:
      receive an input indicative of the salable unit, the input including a current date,
      generate a set of comparable salable unit data based on the input, wherein each respective comparable salable unit data in the set of comparable salable unit data includes a respective prior date within a date threshold from the current date, store the set of comparable salable unit data in a temporary storage table;

access the temporary storage table to determine the set of lowest corresponding price data by applying an exclusion model to the set of comparable salable unit data, wherein the exclusion model is a machine learning model trained with (i) a set of prior inputs, (ii) a set of prior comparable salable unit data, and (iii) a set of prior lowest corresponding price data and is configured to output the set of lowest corresponding price data, responsive to determining the set of lowest corresponding price data, wipe the set of comparable salable unit data from the temporary storage table, transmit a notification of the set of lowest corresponding price data for display to a user, the notification indicating a lowest corresponding price for each lowest corresponding price data, store the set of lowest corresponding price data into an historical transaction log, determine whether the invoice reporting table includes an anomalous entry by:
- comparing each entry in the invoice reporting table with the historical transaction log, and
- determining a respective entry in the invoice reporting table that does not have a corresponding set of lowest corresponding price data in the historical transaction log is the anomalous entry, responsive to determining that the invoice reporting table includes the anomalous entry, transmit a notification to a user indicating the anomalous entry, and periodically update the exclusion model by:
- retrieving entries from the historical transaction log and corresponding entries from the invoice reporting table,
- comparing the entries from the historical transaction log with the corresponding entries from the invoice reporting table, and
- training the exclusion model using each entry from the historical transaction log that does not satisfy a confidence threshold when analyzed in tandem with at least one corresponding entry from the invoice reporting table as inputs to output a subsequent set of lowest corresponding price data.

9. The system of claim 8, wherein the computer-readable instructions, when executed, further cause the one or more processors to:

incorporate a recent comparable salable unit data into the set of comparable salable unit data, the recent comparable salable unit data including a recent prior date within the date threshold from the current date; and remove any respective comparable salable unit data from the set of comparable salable unit data wherein the respective prior date of the respective comparable salable unit data exceeds the date threshold from the current date.

10. The system of claim 8, wherein the computer-readable instructions, when executed, further cause the one or more processors to:

generate the set of comparable salable unit data based on the invoice reporting table;

(a) access the historical transaction log to retrieve a first set of entries made during a duration;

(b) access the invoice reporting table to retrieve a second set of entries made during the duration;

(c) compare the first set of entries to the second set of entries to determine whether each first entry in the first set of entries satisfies the confidence threshold when analyzed in tandem with a second entry in the second set of entries; and (d) responsive to determining that a respective first entry does not satisfy the confidence threshold when analyzed in tandem with a respective second entry, transmit a notification to a user indicating the respective first entry.

11. The system of claim 10, wherein the computer-readable instructions, when executed, further cause the one or more processors to:

periodically perform steps (a)-(d) each time the duration elapses following a prior duration; and update the exclusion model upon each iteration of steps (a)-(d) by incorporating each respective first entry that is not substantially similar to a respective second entry.

12. The system of claim 8, wherein the computer-readable instructions, when executed, further cause the one or more processors to:

generate the set of comparable salable unit data based on the invoice reporting table.

13. The system of claim 8, wherein applying the exclusion model includes determining (i) a cost of each comparable salable unit data, (ii) a price of each comparable salable unit data, (iii) a bid status of the salable unit, and (iv) a contract status of the salable unit.

14. The system of claim 8, wherein each respective lowest corresponding price data in the set of lowest corresponding price data includes a pass indication or a fail indication.

15. A non-transitory computer readable medium containing program instructions that when executed, cause a computer to:

receive an input indicative of the salable unit, the input including a current date;

generate a set of comparable salable unit data based on the input, wherein each respective comparable salable unit data in the set of comparable salable unit data includes a respective prior date within a date threshold from the current date;

store the set of comparable salable unit data in a temporary storage table;

access the temporary storage table to determine the set of lowest corresponding price data by applying an exclusion model to the set of comparable salable unit data, wherein the exclusion model is a machine learning model trained with (i) a set of prior inputs, (ii) a set of prior comparable salable unit data, and (iii) a set of prior lowest corresponding price data and is configured to output the set of lowest corresponding price data;

responsive to determining the set of lowest corresponding price data, wipe the set of comparable salable unit data from the temporary storage table;

transmit a notification of the set of lowest corresponding price data for display to a user, the notification indicating a lowest corresponding price for each lowest corresponding price data;

store the set of lowest corresponding price data into an historical transaction log;

determine whether the invoice reporting table includes an anomalous entry by:
- comparing each entry in the invoice reporting table with the historical transaction log, and
- determining a respective entry in the invoice reporting table that does not have a corresponding set of lowest corresponding price data in the historical transaction log is the anomalous entry;
responsive to determining that the invoice reporting table includes the anomalous entry, transmit a notification to a user indicating the anomalous entry; and
periodically update the exclusion model by:
retrieving entries from the historical transaction log and corresponding entries from the invoice reporting table,
comparing the entries from the historical transaction log with the corresponding entries from the invoice reporting table, and
training the exclusion model using each entry from the historical transaction log that does not satisfy a confidence threshold when analyzed in tandem with at least one corresponding from the invoice reporting table as inputs to output a subsequent set of lowest corresponding price data.

16. The non-transitory computer readable medium of claim 15, wherein the instructions when executed, further cause the computer to:
incorporate a recent comparable salable unit data into the set of comparable salable unit data, the recent comparable salable unit data including a recent prior date within the date threshold from the current date; and
remove any respective comparable salable unit data from the set of comparable salable unit data wherein the respective prior date of the respective comparable salable unit data exceeds the date threshold from the current date.

17. The non-transitory computer readable medium of claim 15, wherein the set of comparable salable unit data is generated based on the invoice reporting table, and wherein the instructions, when executed, further cause the computer to:
generate the set of comparable salable unit data based on an invoice reporting table;
(a) access the historical transaction log to retrieve a first set of entries made during a duration;
(b) access the invoice reporting table to retrieve a second set of entries made during the duration;
(c) compare the first set of entries to the second set of entries to determine whether each first entry in the first set of entries satisfies the confidence threshold when analyzed in tandem with a second entry in the second set of entries; and
(d) responsive to determining that a respective first entry does not satisfy the confidence threshold when analyzed in tandem with a respective second entry, transmit a notification to a user indicating the respective first entry.

18. The non-transitory computer readable medium of claim 17, wherein the instructions, when executed, further cause the computer to:
periodically perform steps (a)-(d) each time the duration elapses following a prior duration; and
update the exclusion model upon each iteration of steps (a)-(d) by incorporating each respective first entry that is not substantially similar to a respective second entry.

19. The non-transitory computer readable medium of claim 15, wherein the instructions when executed, cause the computer to:
generate the set of comparable salable unit data based on the invoice reporting table.

20. The non-transitory computer readable medium of claim 15, wherein applying the exclusion model includes determining (i) a cost of each comparable salable unit data, (ii) a price of each comparable salable unit data, (iii) a bid status of the salable unit, and (iv) a contract status of the salable unit.

* * * * *

UNITED STATES PATENT AND TRADEMARK OFFICE
CERTIFICATE OF CORRECTION

PATENT NO. : 11,941,651 B2
APPLICATION NO. : 16/829666
DATED : March 26, 2024
INVENTOR(S) : Sandy Marshall Page 1 of 1

It is certified that error appears in the above-identified patent and that said Letters Patent is hereby corrected as shown below:

In the Claims

At Column 22, Line 10, "entry-from" should be -- entry from --.

At Column 23, Line 4, "table;" should be -- table, --.

Signed and Sealed this
Seventh Day of October, 2025

John A. Squires
*Director of the United States Patent and Trademark Office*